US011173786B2

(12) United States Patent
Sano et al.

(10) Patent No.: US 11,173,786 B2
(45) Date of Patent: Nov. 16, 2021

(54) RESIN MOLDED ARTICLE AND VEHICLE DISPLAY DEVICE

(71) Applicant: Yazaki Corporation, Tokyo (JP)

(72) Inventors: Teruomi Sano, Shizuoka (JP); Tatsuya Hattori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 1008 days.

(21) Appl. No.: 15/840,665

(22) Filed: Dec. 13, 2017

(65) Prior Publication Data

US 2018/0099565 A1   Apr. 12, 2018

Related U.S. Application Data

(63) Continuation of application No. PCT/JP2016/071125, filed on Jul. 19, 2016.

(30) Foreign Application Priority Data

Jul. 24, 2015 (JP) .................................. 2015-146572
Mar. 25, 2016 (JP) .................................. 2016-061279

(51) Int. Cl.
*B60K 37/02* (2006.01)
*G01D 13/26* (2006.01)
(Continued)

(52) U.S. Cl.
CPC .............. *B60K 37/02* (2013.01); *B29C 33/42* (2013.01); *F21V 3/00* (2013.01); *F21V 11/00* (2013.01);
(Continued)

(58) Field of Classification Search
CPC ................ B60K 37/02; B60K 2370/18; B60K 2370/20; B29C 33/42; F21V 3/00;
(Continued)

(56) References Cited

U.S. PATENT DOCUMENTS

| 2002/0189526 A1 | 12/2002 | Sugimoto |
| 2003/0189819 A1 | 10/2003 | Furuya |
| 2013/0040090 A1* | 2/2013 | Sakurai ................... C23C 30/00 428/66.6 |

FOREIGN PATENT DOCUMENTS

| JP | 3-30822 U | 3/1991 |
| JP | 8-43145 A | 2/1996 |

(Continued)

OTHER PUBLICATIONS

English translatin of JP 2007-085860 (Published Apr. 2007).*

(Continued)

*Primary Examiner* — Rajarshi Chakraborty
*Assistant Examiner* — Hana S Featherly
(74) *Attorney, Agent, or Firm* — Sughrue Mion, PLLC

(57) ABSTRACT

A resin molded article is applied to a vehicle display device for displaying information on a vehicle, and a high gloss region having a relatively high surface glossiness and a low gloss region having a relatively low surface glossiness are integrally molded. As a result, since the high gloss region and the low gloss region having different surface glossiness are integrally formed in a single resin molded article 1, the resin molded article and the vehicle display device obtain an effect such that various appearances are created with a simple structure.

17 Claims, 6 Drawing Sheets

(51) Int. Cl.
*G01D 11/28* (2006.01)
*B29C 33/42* (2006.01)
*F21V 3/00* (2015.01)
*F21V 11/00* (2015.01)
*G01D 13/22* (2006.01)
*F21Y 115/10* (2016.01)
*B29L 31/30* (2006.01)
*F21V 19/00* (2006.01)

(52) U.S. Cl.
CPC ............. *G01D 11/28* (2013.01); *G01D 13/22* (2013.01); *G01D 13/265* (2013.01); *B29L 2031/3055* (2013.01); *B60K 2370/18* (2019.05); *B60K 2370/20* (2019.05); *F21V 19/0015* (2013.01); *F21Y 2115/10* (2016.08)

(58) Field of Classification Search
CPC ..... F21V 11/00; F21V 19/0015; G01D 11/28; G01D 13/22; G01D 13/265; F21Y 2115/10; B29L 2031/3055
USPC ............................................ 362/509, 311.14
See application file for complete search history.

(56) References Cited

FOREIGN PATENT DOCUMENTS

| | | |
|---|---|---|
| JP | 11-94598 A | 4/1999 |
| JP | 2002-189107 A | 7/2002 |
| JP | 20034495 A | 1/2003 |
| JP | 2003302261 A | 10/2003 |
| JP | 2005-111813 A | 4/2005 |
| JP | 2005140695 A | 6/2005 |
| JP | 2007085860 A * | 4/2007 |
| JP | 2010-112710 A | 5/2010 |
| JP | 2010-197141 A | 9/2010 |
| JP | 2011-189697 A | 9/2011 |
| JP | 2012-154798 A | 8/2012 |
| JP | 2013-83608 A | 5/2013 |
| JP | 2013-139091 A | 7/2013 |
| JP | 2014-43047 A | 3/2014 |

OTHER PUBLICATIONS

Communication dated Nov. 20, 2018 from the Japanese Patent Office in counterpart Application No. 2016-061279.
Communication dated May 8, 2018 from the Japanese Patent Office in counterpart Japanese application No. 2016-061279.
International Search Report for PCT/JP2016/071125 dated Sep. 6, 2016 [PCT/ISA/210].

* cited by examiner

ରESIN MOLDED ARTICLE AND VEHICLE
DISPLAY DEVICE

CROSS-REFERENCE TO RELATED
APPLICATION

This application is a continuation application of International Application PCT/JP2016/071125, filed on Jul. 19, 2016, and designating the U.S., the entire contents of which are incorporated herein by reference.

BACKGROUND OF THE INVENTION

1. Field of the Invention

The present invention relates to a resin molded article and a vehicle display device.

2. Description of the Related Art

As a resin molded article to be applied to a vehicle or the like, for example, Japanese Patent Application Laid-open No. 2011-189697 discloses a resin molded article which has grains molded on the surface and is applied to a bumper of a car exterior part. In the resin molded article, the grain depth is equal to or more than three μm and equal to or less than five μm, the grain pitch is equal to or more than 550 μm and equal to or less than 750 μm, and a 60° gloss on the surface of the grain is equal to or more than 28 and equal to or less than 35. Accordingly, even when the resin molded article is not coated, a scratch resistance of the resin molded article is not deteriorated. In a case where the coating is performed, an appearance quality of the resin molded article is not deteriorated.

Meanwhile, such a resin molded article may be applied to, for example, a vehicle display device and the like mounted on a vehicle. However, it has been desired to create more various appearances with a simpler structure on the surface in the region which may be included in a field of view of an occupant and the like in such a case.

SUMMARY OF THE INVENTION

The present invention has been made in consideration of the above circumstances. An object of the present invention is to provide a resin molded article and a vehicle display device which can create various appearances with a simple structure.

To achieve the purpose, a resin molded article according to one aspect of the present invention is to be applied to a vehicle display device for displaying information on a vehicle, and has a high gloss region having a relatively high surface glossiness and a low gloss region having a relatively low surface glossiness which are integrally molded, wherein the high gloss region and the low gloss region are adjacent to each other, and a step boundary surface is formed by a step between the high gloss region and the low gloss region.

According to another aspect of the present invention, in the resin molded article, the step boundary surface has a surface glossiness relatively higher than that of the low gloss region.

According to still another aspect of the present invention, in the resin molded article, the high gloss region is positioned apart from the low gloss region with respect to a viewing position.

In the resin molded article, the high gloss region and the low gloss region can be formed to respectively have different patterns on the surface.

In the resin molded article, the low gloss region can be formed as an annular region so as to surround the high gloss region, and the high gloss region can be formed as a region in the low gloss region.

In the resin molded article, the step boundary surface can be formed so that an angle formed by the step boundary surface and a reference line-of-sight direction line along the line-of-sight direction from a viewing position which has been previously set is within a range of about 5° on both sides of the reference line-of-sight direction line.

In the resin molded article, the step boundary surface can be formed to be inclined to the reference line-of-sight direction line along the line-of-sight direction so that the high gloss region and the low gloss region are formed to be overlapped with each other in a zigzag form as viewed from the viewing position, which has been previously set, in the line-of-sight direction.

According to still another aspect of the present invention, in the resin molded article, the vehicle display device may have a pointer for pointing the information on the vehicle, the pointer may include a pointer light emitter that emits light by light from a light source, a shielding part that is interposed between the light source and the viewing position and shields light emitted from the light source toward the viewing position, and a pointer base end cover that is molded integrally with the shielding part and covers a base end of the pointer light emitter, the high gloss region may be molded on a surface of the pointer base end cover on a side of the viewing position, and the low gloss region may be molded on a surface of the shielding part on the side of the viewing position.

According to still another aspect of the present invention, in the resin molded article, the vehicle display device may include a display unit for displaying the information on the vehicle and a viewing position facing surface opposed to the viewing position and on which the display unit is exposed, the high gloss region may be molded on the surface of the viewing position facing surface on the side of the viewing position and the surface of a region around the display unit, and the low gloss region may be molded on the surface of the viewing position facing surface on the side of the viewing position and in a region outside the region around the display unit.

According to still another aspect of the present invention, in the resin molded article, the vehicle display device may include the viewing position facing surface opposed to the viewing position and a standing surface projected from the viewing position facing surface toward the viewing position along a direction intersecting with the viewing position facing surface, the high gloss region may be molded on the surface of the standing surface on the side of the viewing position, and the low gloss region may be molded on the surface of the standing surface on the side of the viewing position facing surface.

To achieve the purpose, a vehicle display device according to still another aspect of the present invention includes a display unit configured to be mounted on a vehicle and display information on the vehicle; and a resin molded article configured to be provided around the display unit or in a part of the display unit, and that has a high gloss region having a relatively high surface glossiness and a low gloss region having a relatively low surface glossiness which are integrally molded, wherein the high gloss region and the low gloss region are adjacent to each other, and a step boundary surface is formed by a step between the high gloss region and the low gloss region.

DETAILED DESCRIPTION OF THE PREFERRED EMBODIMENTS

Embodiments according to the present invention will be described in detail below with reference to the drawings. Note that the present invention is not limited to the embodiments. In addition, components in the following embodiments include those that can be easily replaced by those skilled in the art or those substantially the same as the components in the embodiment.

First Embodiment

Figure 1:
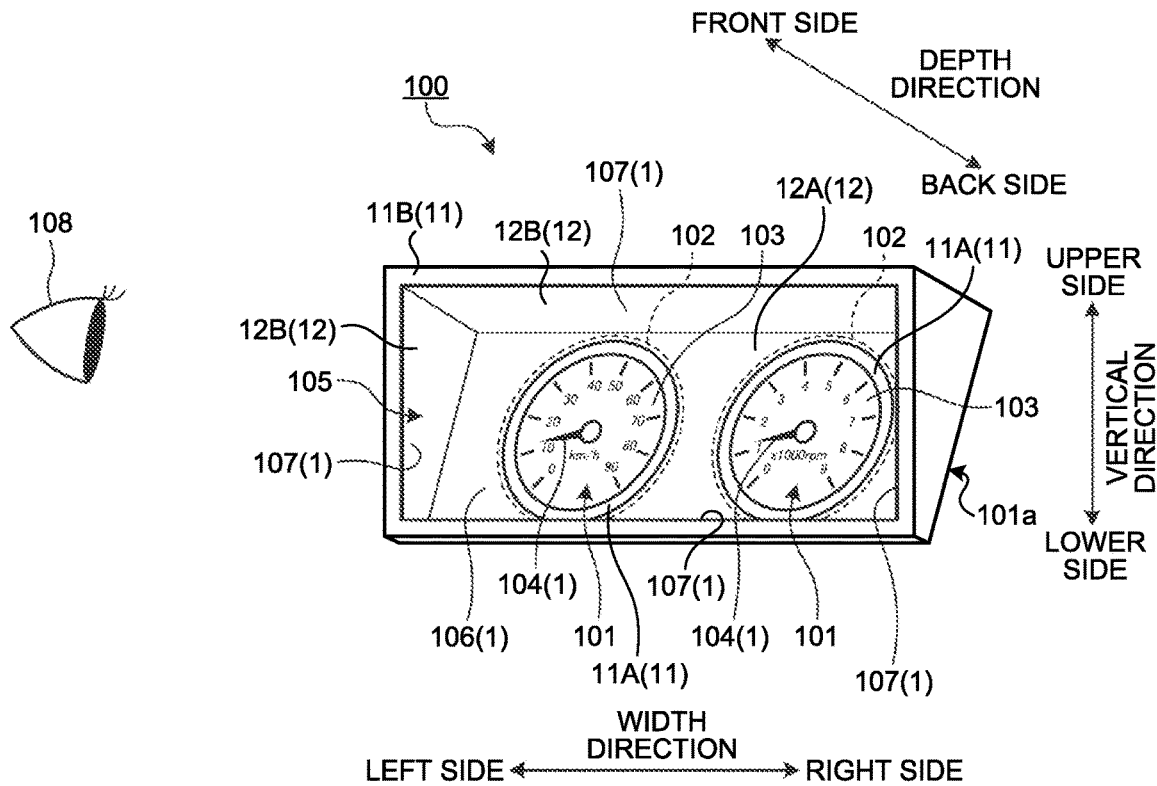
FIG. 1 is a perspective view of a schematic configuration of a vehicle display device to which a resin molded article according to a first embodiment is applied.
Figure 2:
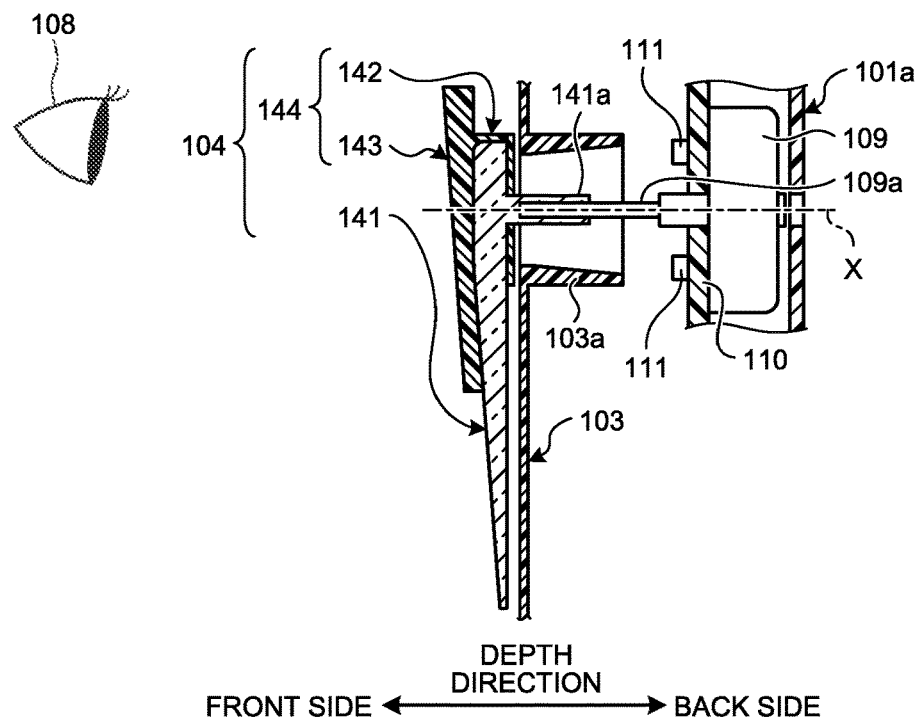
FIG. 2 is a partial cross-sectional view including a pointer of the vehicle display device to which the resin molded article according to the first embodiment is applied.
Figure 3:
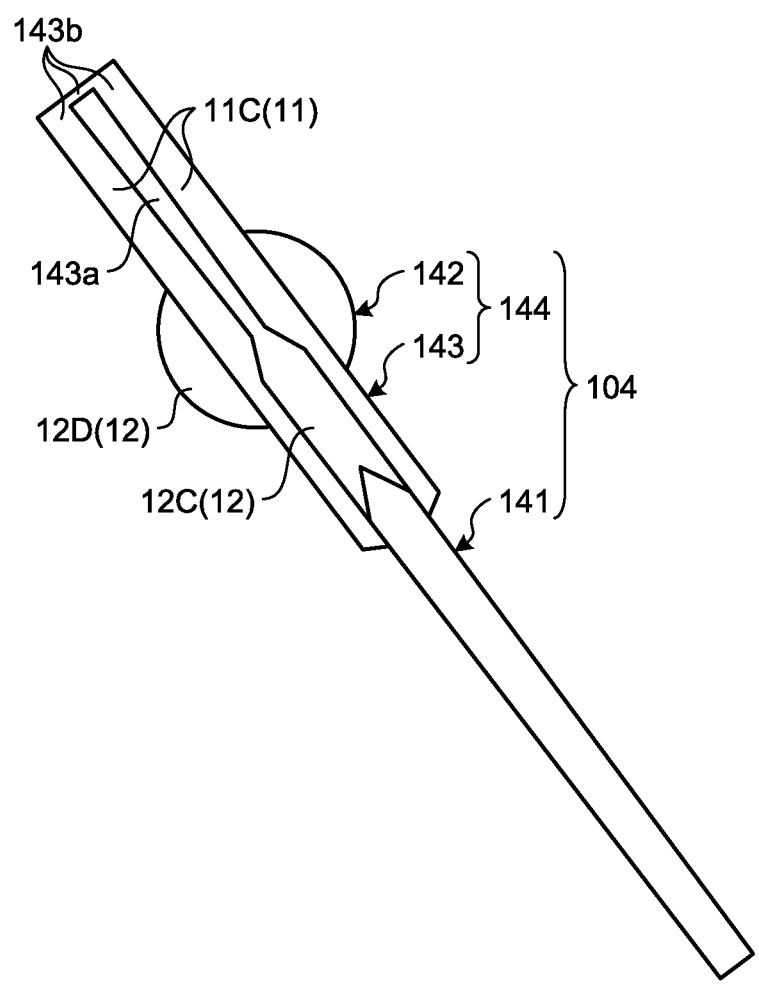
FIG. 3 is a front view of the pointer of the vehicle display device to which the resin molded article according to the first embodiment is applied.

FIG. 1 is a perspective view of a schematic configuration of a vehicle display device to which a resin molded article according to a first embodiment is applied. FIG. 2 is a partial cross-sectional view including a pointer of the vehicle display device to which the resin molded article according to the first embodiment is applied. FIG. 3 is a front view (viewed from viewing position side) of the pointer of the vehicle display device to which the resin molded article according to the first embodiment is applied.

As illustrated in FIG. 1, a resin molded article 1 according to the present embodiment is applied to each part of a vehicle display device 100 mounted on a vehicle. The vehicle display device 100 according to the present embodiment is included in a so-called onboard meter. For example, the vehicle display device 100 is mounted on an instrument panel provided on a dashboard of the vehicle and displays various information on the vehicle as information provided to drive the vehicle. In the vehicle display device 100 includes a display unit 101 which is mounted on the vehicle and displays information on the vehicle and a resin molded article 1 provided around the display unit 101 or in a part of the display unit 101.

The width direction of the vehicle display device 100 illustrated in FIG. 1 typically corresponds to a vehicle width direction of the vehicle to which the vehicle display device 100 is applied. In the following description, in the width direction of the vehicle display device 100, the left side (left side in FIG. 1) of the front surface of the vehicle display device 100 is referred to as the left side in the width direction, and the right side (right side in FIG. 1) of the front surface is referred to as the right side in the width direction. The depth direction of the vehicle display device 100 illustrated in FIG. 1 typically corresponds to the front-back direction of the vehicle to which the vehicle display device 100 is applied. The front side of the vehicle display device 100 is the side opposed to the driver's seat of the vehicle, and typically is the side visually recognized by a driver sitting on the driver's seat. A viewing position 108 to be described later is positioned on the front side of the vehicle display device 100 in the depth direction. On the other hand, the back side of the vehicle display device 100 is opposite to the front side in the depth direction, and is typically the side housed in the instrument panel.

The display unit 101 has a light source unit 102, and displays various information on the vehicle by using light emitted from the light source unit 102. The display unit 101 displays various information used to drive the vehicle such as a vehicle speed, an output rotation speed of a driving power source, an accumulated mileage, a warning display (so-called telltale), and a shift position indicator as the information on the vehicle. Here, as an example, two display units 101 are provided at intervals along the width direction, and each display unit 101 includes the light source unit 102, a dial plate 103, a pointer 104, and the like. The display unit 101 is an analog instrument that analogically displays various measured values regarding the vehicle by the pointer 104. The light source unit 102 is arranged on the back side of the dial plate 103 in the depth direction. The dial plate 103 indicates measured values such as a speed and an output rotation speed as the information on the vehicle, and an indicator part pointed by the pointer 104, a symbol for warning display, and the like are drawn. The dial plate 103 is, for example, a polycarbonate sheet of a transparent fabric, and printing with a hollowed shape corresponding to the indicator part and the symbol for warning display is performed by using a dark color ink. The light source unit 102 includes a light source body such as an LED element, a diffusion plate for diffusing the light emitted from the light source body to the side of the dial plate 103, and the like. In each display unit 101, the light emitted from the light source unit 102 passes through the part of the dial plate 103 where the indicator part and the symbol for warning display are cut out so that the indicator part and the symbol for warning display are displayed. The indicator part pointed by the pointer 104 includes an arc along the rotational locus of the top end of the pointer 104 and a plurality of graduations, numbers, and the like applied at equal intervals along the arc. The pointer 104 constitutes a part of the display unit 101 and points the information on the vehicle. The pointer 104 is positioned on the front side of the dial plate 103 in the depth direction, and points a predetermined position of the indicator part according to various measured values (speed, output rotation speed, and the like) regarding the vehicle. The current speed and the output rotation speed are respectively indicated by the pointers 104 on the display units 101. It is preferable that the display unit 101 includes the light source unit 102 and display various information on the vehicle by the light source unit 102. For example, the display unit 101 may be a liquid crystal display device or the like.

The resin molded article 1 is provided around the display unit 101 or in a part of the display unit 101. Here, the resin molded article 1 is provided around the display unit 101 and in a part of the display unit 101. In the resin molded article 1, a high gloss region 11 having a relatively high surface glossiness and a low gloss region 12 having a relatively low surface glossiness are integrally molded. The high gloss region 11 is a region having higher glossiness than the low gloss region 12. Conversely, the low gloss region 12 is a region having lower glossiness than the high gloss region 11. In other words, the high gloss region 11 is a region with relatively high gloss, and the low gloss region 12 is a region with relatively low gloss. Here, the glossiness is typically an index that one-dimensionally indicates a degree of the gloss of the object surface with a focus on a proportion of regular reflection light, direction distribution of diffusion reflection light, and the like. The larger the value of the glossiness is, the more the amount of the reflection of the light and the more the gloss are. Here, as the glossiness, for example, so-called specular glossiness (ratio of light flux reflected from object in specular direction with specified light source and at specified angle of light receiver and light flux reflected from glass having refractive index of 1.567 in specular direction) can be used. However, the glossiness is not limited to this. The glossiness can be measured by using various measuring instruments. Typically, in a case where the glossiness is measured by the same kind of measuring instruments, the high gloss region 11 is a region where the average glossiness of the region is relatively high, and the low gloss region 12 is a region where the average glossiness of the region is relatively low.

The low gloss region 12 is molded as, for example, a rough surface region where a plurality of fine asperities is formed on the surface, and the gloss of the surface is reduced by scattering the light entered the low gloss region 12 by the plurality of fine asperities. On the other hand, for example, the high gloss region 11 is molded as a flat smooth region having a higher surface smoothness than the low gloss region 12, and the high gloss region 11 is molded as a region where the gloss of the surface is higher than the low gloss region 12 by reflecting the light entered the high gloss region 11 by the flat surface. For example, the high gloss region 11 and the low gloss region 12 are integrally molded by transferring a surface pattern of the mirror-like molded surface and a surface pattern of the molded surface with fine asperities in a common resin molding die for molding the resin molded article 1, on the surface of a predetermined region of the resin molded article 1 at the time of molding. As a material used as the resin molded article 1, for example, various synthetic resins can be used.

More specifically, the resin molded article 1 according to the present embodiment is applied to a facing plate 105 and the pointer 104 of the vehicle display device 100.

The facing plate 105 is a frame-shaped member which is assembled to the front side of a housing 101a of the vehicle display device 100 in the depth direction and surrounds the dial plate 103 and the like to press the dial plate 103 and the like. The facing plate 105 can be a decorative material of a part which is exposed on the front side in the depth direction of the vehicle display device 100 and can enter the field of view of an occupant including the driver. The facing plate 105 includes a surrounding surface 106 as a viewing position facing surface surrounding each display unit 101 and standing surfaces 107. Each of the standing surfaces 107 is erected from an edge of the surrounding surface 106 along the depth direction. The surrounding surface 106 has a notch in a part corresponding to each display unit 101, and each display unit 101 is exposed from the notch. The standing surface 107 is a surface projecting from the edge of the surrounding surface 106 along the depth direction. That is, the surrounding surface 106 is positioned between the light source unit 102 included in the display unit 101 and the viewing position 108 of the occupant and the like with respect to the depth direction. In addition, the surrounding surface 106 is formed as a surface intersecting with the arrangement direction of the light source unit 102 and the viewing position 108, that is, the depth direction, and more specifically, a surface opposed to the viewing position 108 along the depth direction. On the other hand, the standing surface 107 is positioned between the light source unit 102 included in the display unit 101 and the viewing position 108 of the occupant and the like with respect to the depth direction. In addition, the standing surface 107 is projected toward the side of the driver along the arrangement direction of the light source unit 102 and the viewing position 108, that is, the depth direction. That is, the standing surface 107 is projected from the surrounding surface 106 toward the side of the viewing position 108 along the direction intersecting with the surrounding surface 106. Here, the four standing surfaces 107 are provided in total. Two standing surfaces 107 are respectively provided along the width direction on both of the upper and lower sides of the surrounding surface 106 in the vertical direction, and two standing surfaces 107 are respectively provided along the vertical direction on both of the right and left sides of the surrounding surface 106 in the width direction. However, the number of the standing surfaces 107 is not limited to this. In the facing plate 105, the surrounding surface 106 and each standing surface 107 are integrally molded.

In the resin molded article 1 forming the facing plate 105 according to the present embodiment, the high gloss region 11 includes ring-shaped high gloss regions 11A and a frame-shaped high gloss region 11B, and the low gloss region 12 includes a front low gloss region 12A and a side low gloss region 12B.

The ring-shaped high gloss region 11A in the high gloss region 11 of the resin molded article 1 forming the facing plate 105 is molded on the surface of the surrounding surface 106 on the side of the viewing position 108 and the surface of the region around the display unit 101. Here, the two ring-shaped high gloss regions 11A are provided in total, one ring-shaped high gloss regions 11A is provided for each display unit 101. Each of the ring-shaped high gloss regions 11A is formed in a ring shape (annular shape) around each display unit 101. The frame-shaped high gloss region 11B is molded on the surface of the standing surface 107 on the side of the viewing position 108. The frame-shaped high gloss region 11B is formed in a substantially square shape across the end face on the side of the viewing position 108 side of the four standing surfaces 107 (in other words, end face on the front side in the depth direction).

In the low gloss region 12 of the resin molded article 1 forming the facing plate 105, the front low gloss region 12A is molded on the surface of the surrounding surface 106 on the side of the viewing position 108 and in a region around the display unit 101, here, a region outside the ring-shaped high gloss region 11A. Here, on the surface of the surrounding surface 106 on the side of the viewing position 108, the front low gloss region 12A is molded in regions where the two display units 101 are exposed and a region other than the two ring-shaped high gloss regions 11A. The side low gloss region 12B is molded on the surface of the standing surface 107 on the side of the surrounding surface 106.

As described above, in the resin molded article 1 forming the facing plate 105, the surrounding surface 106 and each of the standing surfaces 107 are integrally molded, and the ring-shaped high gloss region 11A, the frame-shaped high gloss region 11B, the front low gloss region 12A, and the side low gloss region 12B are integrally molded.

As described above, the pointer 104 points a predetermined position of the indicator part according to various measured values regarding the vehicle. As illustrated in FIGS. 2 and 3, the pointer 104 according to the present embodiment includes a pointer light emitter 141, a pointer cap 142 as a shielding part, and a pointer base end cover 143.

The pointer light emitter 141 is a pointer main body formed in a bar shape, and a rotary shaft portion 141a is formed on one end side to be the base end. The rotary shaft portion 141a is projected along the direction intersecting with an extending direction of the pointer light emitter 141 formed in a bar shape. The rotary shaft portion 141a is inserted into a boss portion 103a of the dial plate 103 and a rotor shaft 109a of a drive motor 109 is inserted into the rotary shaft portion 141a so that the pointer light emitter 141 is assembled with the rotor shaft 109a. The drive motor 109 is assembled on the back side in the depth direction of a wiring board 110 disposed in the housing 101a constituting the vehicle display device 100, and the rotor shaft 109a passes through the wiring board 110 along the depth direction and projects forward. In the pointer 104, the central axis line of the rotor shaft 109a is the rotation axis X. The pointer light emitter 141 is formed of a transmissive resin material or the like that transmits light, and emits light with light from a light source 111. The light source 111 is configured of an LED element or the like and is mounted on a surface on the front side of the wiring board 110 in the depth direction. The plurality of light sources 111 is provided in the vicinity of the rotation axis X, here, to be positioned in the boss portion 103a as viewed from the front side in the depth direction. The rotary shaft portion 141a also functions as a light guide shaft for guiding the light emitted from the light source 111 to the bar-shaped part of the pointer light emitter 141.

The pointer cap 142 is interposed between the light source 111 and the viewing position 108 and shields the light emitted from the light source 111 toward the viewing position 108. The pointer cap 142 is formed in a cylindrical shape. One end of the cylindrical pointer cap 142 is closed, and the other end is opened. The pointer cap 142 is attached to the base end of the pointer light emitter 141 from the side of the opening, that is, the end where the rotary shaft portion 141a is provided. The pointer base end cover 143 is integrally molded with the pointer cap 142 and covers the base end of the pointer light emitter 141. The pointer base end cover 143 covers the base end of the pointer light emitter 141, that is, the end where the rotary shaft portion 141a is provided. The pointer base end cover 143 is formed in a bar-like shape to be continuous with the pointer light emitter 141 formed in a bar-like shape in a state of covering the base end of the pointer light emitter 141.

In the pointer 104 configured as described above, the bar-shaped part of the pointer light emitter 141 is positioned on the front side of the dial plate 103 in the depth direction, and the drive motor 109 rotates and drives to rotate the pointer light emitter 141 around the rotation axis X as the center of rotation, and the pointer light emitter 141 points a predetermined position of the indicator part according to various measured value regarding the vehicle.

The resin molded article 1 is applied to the pointer cap 142 and the pointer base end cover 143 according to the present embodiment, and the pointer cap 142 and the pointer base end cover 143 are integrally molded and form a pointer hood portion 144. The pointer hood portion 144 covers the light source 111, the rotary shaft portion 141a which also functions as a light guide shaft, and the like from the side of the viewing position 108. The pointer hood portion 144 is formed of a light-shielding resin material or the like which does not transmit light and shields the light from the light source 111, and prevents leakage of the light. As a result, the pointer hood portion 144 prevents the light from the light source 111 from directly and visually recognized at the viewing position 108 and prevents the base end, the rotary shaft portion 141a, and the like of the pointer light emitter 141 from being viewed from the side.

In the resin molded article 1 forming the pointer hood portion 144, the high gloss region 11 includes a cover high gloss region 11C, and the low gloss region 12 includes a cover low gloss region 12C and a cap low gloss region 12D.

The high gloss region 11 of the resin molded article 1 forming the pointer hood portion 144, that is, the cover high gloss region 11C is molded on the surface of the pointer base end cover 143 on the side of the viewing position 108. Here, the pointer base end cover 143 includes a groove 143a formed along the extending direction on the surface on the side of the viewing position 108 and an edge 143b formed to surround three sides of the groove 143a. The edge 143b is formed along three sides of the pointer base end cover 143 on the side of the viewing position 108 except for the side on which the pointer light emitter 141 is positioned. The groove 143a is formed as a portion which is surrounded by the edge 143b, and the surface of the groove 143a is dropped off against the edge 143b. The cover high gloss region 11C according to the present embodiment is molded on the surface of the edge 143b in the surface of the pointer base end cover 143 on the side of the viewing position 108.

In the low gloss region 12 of the resin molded article 1 constituting the pointer hood portion 144, the cover low gloss region 12C is molded on the surface of the pointer base end cover 143 on the side of the viewing position 108. The cover low gloss region 12C according to the present embodiment is molded on the surface of the groove 143a in the surface of the pointer base end cover 143 on the side of the viewing position 108. The cap low gloss region 12D is molded on the surface of the pointer cap 142 on the side of the viewing position 108. The cap low gloss region 12D according to the present embodiment is molded on the surfaces of two semicircular regions of the pointer cap 142 on the side of the viewing position 108.

As described above, regarding the resin molded article 1 forming the pointer hood portion 144, the pointer cap 142 and the pointer base end cover 143 are integrally molded, and the cover high gloss region 11C, the cover low gloss region 12C, and the cap low gloss region 12D are integrally molded.

According to the resin molded article 1 described above, the resin molded article 1 is applied to the vehicle display device 100 for displaying the information on the vehicle, and the high gloss region 11 having a relatively high surface glossiness and the low gloss region 12 having a relatively low surface glossiness are integrally molded. The vehicle display device 100 described above includes the display unit 101 mounted on the vehicle and for displaying the information on the vehicle, and the resin molded article 1.

Therefore, in the resin molded article 1 and the vehicle display device 100, since the high gloss region 11 and the low gloss region 12 having different surface glossiness are integrally molded in the single resin molded article 1, the gloss of the surface of the low gloss region 12 can be reduced, and the gloss of the surface of the high gloss region 11 can be improved. Therefore, the gloss in the single resin molded article 1 can be largely different according to the position. As a result, the resin molded article 1 and the vehicle display device 100 can create various appearances with a simple structure. For example, it is possible to realize a novel appearance with a simple structure. For example, since the resin molded article 1 and the vehicle display device 100 can variously combine the gloss of the surface in the visual field region of the occupant including the driver in the vehicle, a contrast can be generated according to a difference between the glosses in the single resin molded article 1. As a result, a change in appearance can be caused, and, for example, high-quality feeling can be created in the appearance. In addition, the resin molded article 1 and the vehicle display device 100 can realize various combinations of gloss on the surface without coating. As a result, the resin molded article 1 and the vehicle display device 100 can suppress the number of working steps at the time of manufacturing than a case of performing coating or the like, and it is possible to suppress the manufacturing cost.

Furthermore, according to the resin molded article 1 described above, the vehicle display device 100 includes the pointer 104 for pointing the information on the vehicle, and the pointer 104 includes the pointer light emitter 141 which emits light by the light from the light source 111, the pointer cap 142 which is interposed between the light source 111 and the viewing position 108 and shields the light emitted from the light source 111 toward the viewing position 108, and the pointer base end cover 143 which is integrally molded with the pointer cap 142 and covers the base end of the pointer light emitter 141. The high gloss region 11 is molded on the surface of the pointer base end cover 143 on the side of the viewing position 108, and the low gloss region 12 is molded on the surface of the pointer cap 142 on the side of the viewing position 108. Therefore, in the resin molded article 1 and the vehicle display device 100, according to the contrast between the high gloss region 11 molded on the side of the pointer base end cover 143 and the low gloss region 12 molded on the side of the pointer cap 142, the side of the pointer base end cover 143 formed to be continuous with the pointer light emitter 141 and formed in a bar shape can be highlighted as a higher gloss region, and the side of the pointer cap 142 which is an additional part to shield the light can be matted as a lower gloss region and be made to be inconspicuous. In addition, in the resin molded article 1 and the vehicle display device 100, for example, the side of the pointer cap 142 can be made to be inconspicuous by the contrast caused by the gloss difference as described above without using coating and a hot stamp. Therefore, while plastic feeling which tends to provide a cheap image is reduced, it is possible to suppress the number of working steps at the time of manufacturing and the manufacturing cost.

In addition, according to the resin molded article 1 described above, the vehicle display device 100 includes the display unit 101 for displaying the information on the vehicle and the surrounding surface 106 which is opposed to the viewing position 108 and on which the display unit 101 is exposed. The high gloss region 11 is molded on the surface of the surrounding surface 106 on the side of the viewing position 108 which is the surface of the region around the display unit 101, and the low gloss region 12 is molded on the surface of the surrounding surface 106 on the side of the viewing position 108 and in a region outside the region around the display unit 101. Therefore, the resin molded article 1 and the vehicle display device 100 can obtain a visual effect such that a ring-shaped member which is a separated part is incorporated by making the region around the display unit 101 appear by the contrast between the high gloss region 11 molded in the region around the display unit 101 on the surrounding surface 106 and the low gloss region 12 molded outside the high gloss region 11. As a result, the resin molded article 1 and the vehicle display device 100 can create high-quality feeling in appearance without actually using the ring-shaped member which is the separated part. Accordingly, the number of working steps at the time of manufacturing can be suppressed and the manufacturing cost can be suppressed.

Furthermore, according to the resin molded article 1 described above, the vehicle display device 100 includes the surrounding surface 106 opposed to the viewing position 108 and the standing surfaces 107 projected from the surrounding surface 106 toward the viewing position 108 along the direction intersecting with the surrounding surface 106. The high gloss region 11 is molded on the surface of the standing surface 107 on the side of the viewing position 108, and the low gloss region 12 is molded on the surface of the standing surface 107 on the side of the surrounding surface 106. Therefore, in the resin molded article 1 and the vehicle display device 100, a visual effect can be obtained such that a frame-like member which is a separated part is incorporated by making the end surface of the standing surface 107 on the side of the viewing position 108 appear by the contrast between the high gloss region 11 molded on the end face of the standing surface 107 on the side of the viewing position 108 and the low gloss region 12 molded on the surface on the side of the surrounding surface 106. As a result, for example, the resin molded article 1 and the vehicle display device 100 can create high-quality feeling in appearance without actually using the frame-like member which is the separated part. Accordingly, the number of working steps at the time of manufacturing can be suppressed, and the manufacturing cost can be suppressed.

Second Embodiment

Figure 4:
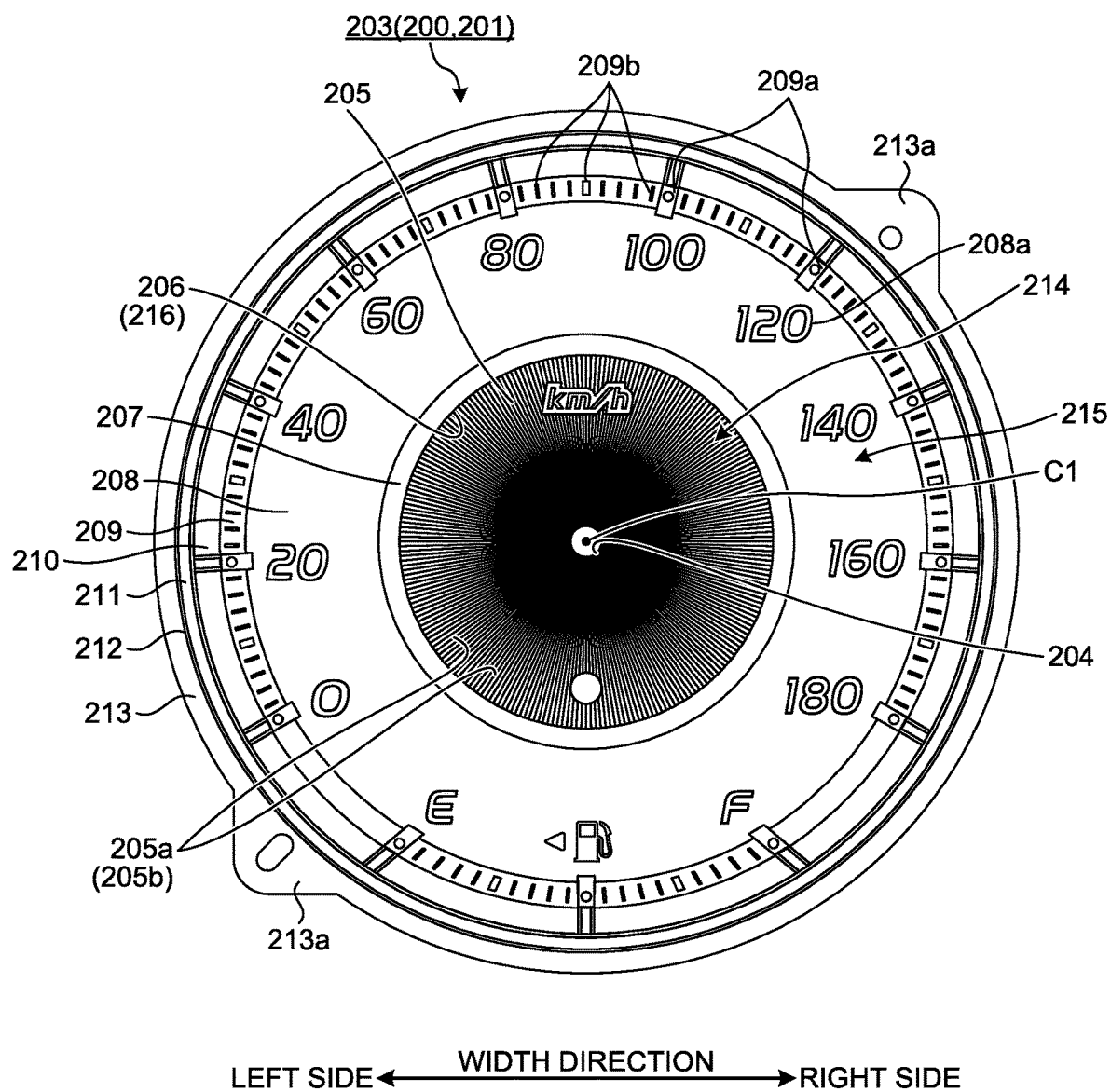
FIG. 4 is a front view of a schematic configuration of a resin molded article according to a second embodiment.
Figure 5:
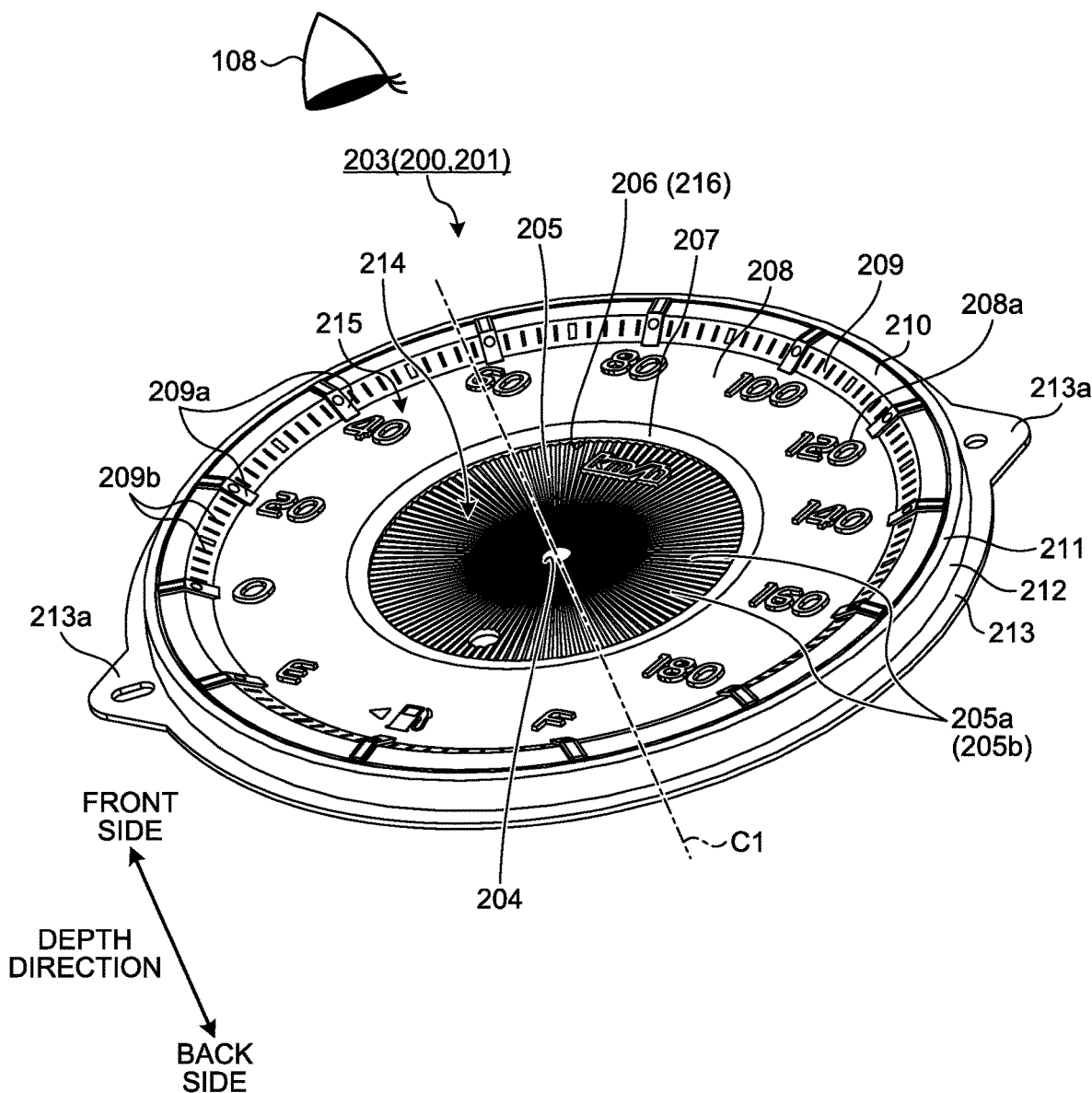
FIG. 5 is a perspective view of a schematic configuration of the resin molded article according to the second embodiment.
Figure 6:
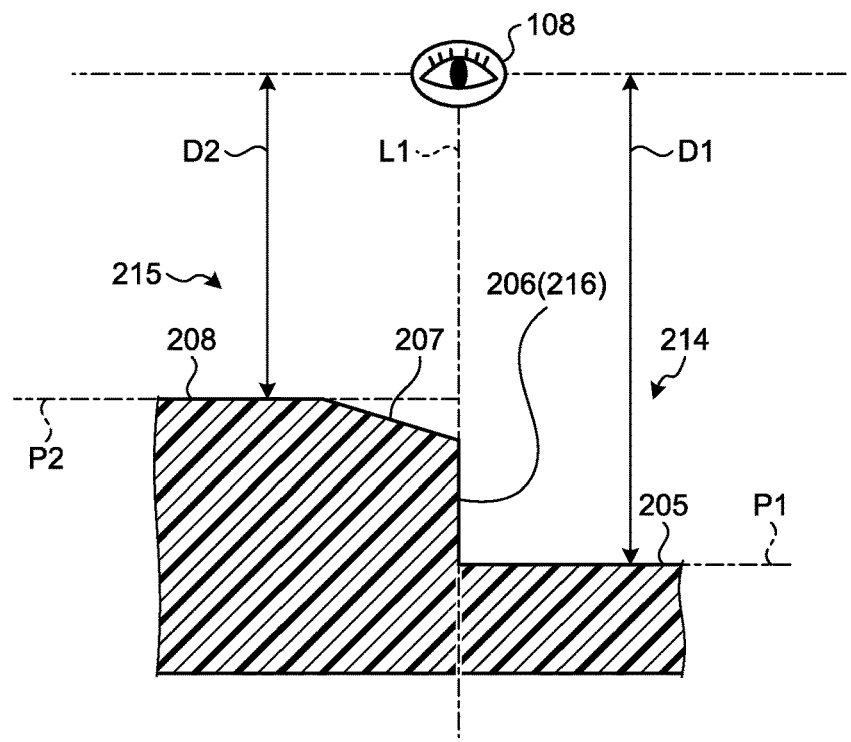
FIG. 6 is a schematic cross-sectional view to describe an angle formed by a step boundary surface and a reference line-of-sight direction line.
Figure 7:
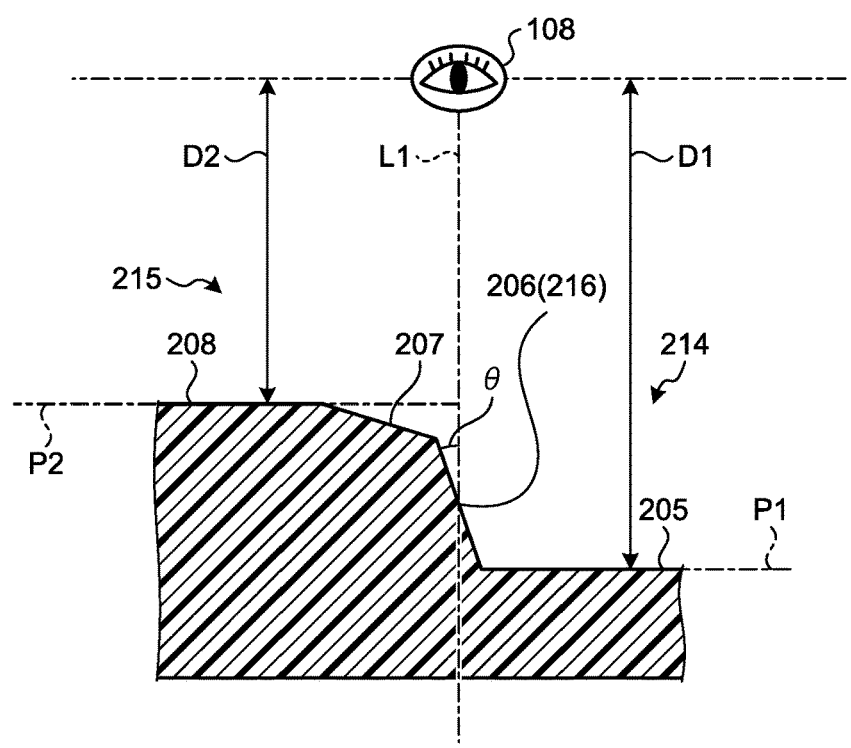
FIG. 7 is a schematic cross-sectional view to describe the angle formed by the step boundary surface and the reference line-of-sight direction line.
Figure 8:
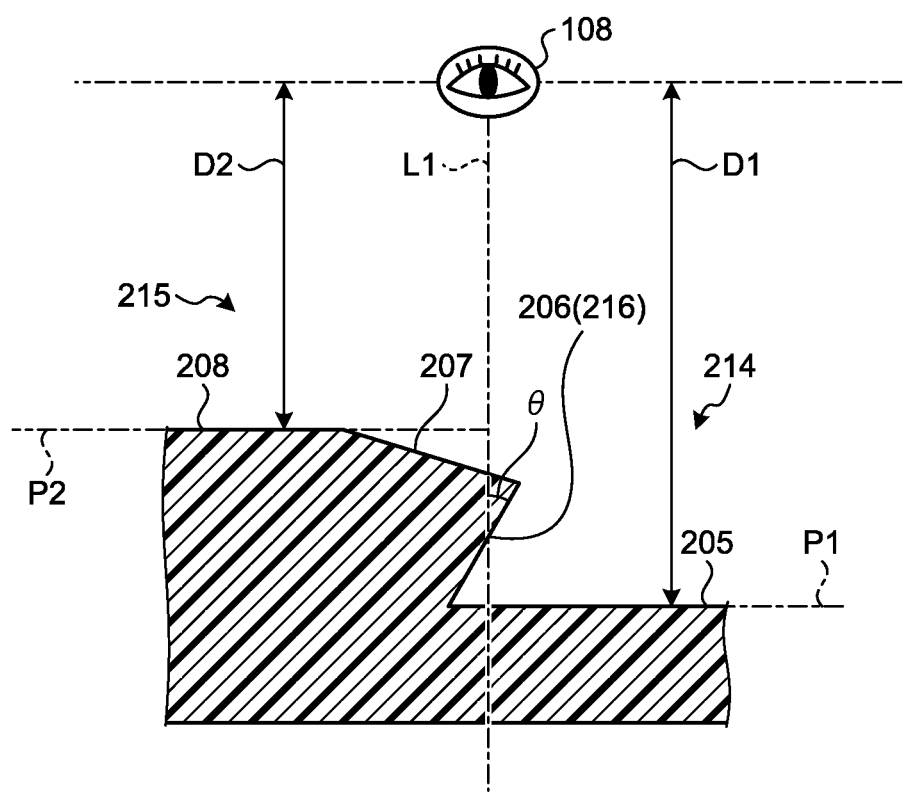
FIG. 8 is a schematic cross-sectional view to describe the angle formed by the step boundary surface and the reference line-of-sight direction line.

FIG. 4 is a front view of a schematic configuration of a resin molded article according to a second embodiment. FIG. 5 is a perspective view of a schematic configuration of the resin molded article according to the second embodiment. FIGS. 6 to 8 are schematic cross-sectional views to describe an angle formed by a step boundary surface and a reference line-of-sight direction line. Regarding the resin molded article and a vehicle display device according to the second embodiment, an application target of the resin molded article is different from that of the first embodiment. Hereinafter, the components similar to those in the above embodiment are denoted with the common reference numerals, and overlapped description of structures, actions, and effects common to those in the above embodiment is omitted as possible.

As illustrated in FIGS. 4 and 5, a resin molded article 201 according to the present embodiment is applied to a dial plate 203 of a vehicle display device 200 mounted on the vehicle. The configuration of the vehicle display device 200 other than the dial plate 203 is substantially similar to that of the vehicle display device 100. The dial plate 203 forms a part of the display unit 101 instead of the dial plate 103.

In the dial plate 203 configured as the resin molded article 201 according to the present embodiment, a surface on the front side in the depth direction, that is, a surface that faces the driver's seat of the vehicle and is visually recognized by a driver or the like sitting on the driver's seat configures a display surface. Here, the dial plate 203 is formed in a substantially circular shape as a whole. In the dial plate 203, a shaft hole 204 is formed in a region including a substantially circular central axis line C1. The shaft hole 204 is a hole through which the rotary shaft portion 141a of the pointer 104 passes and passes through the dial plate 203 in the depth direction. The shaft hole 204 is formed in a substantially circular shape around the central axis line C1. Then, in the dial plate 203, a central disk portion 205, a boundary rising portion 206, an inclined portion 207, a character display portion 208, a graduation portion 209, a frame-like portion 210, an annular corner portion 211, a cylindrical end surface portion 212, and a mounting portion 213 are formed in a substantially annular shape and are concentrically arranged around the central axis line C1 in order from the side of the shaft hole 204 outward in a radial direction.

The central disk portion 205 is formed in a substantially annular shape outward in the radial direction of the shaft hole 204. On the central disk portion 205, a radiation pattern 205b is formed by a plurality of grooves 205a formed on the surface, and a character string such as a unit of physical quantity regarding the vehicle, here, "km/h" or the like is provided. The radiation pattern 205b is a pattern formed by radially extending the plurality of grooves 205a outwardly from a preset reference point (for example, point on central axis line C1) or the vicinity of the reference point. The radiation pattern 205b may be referred to as a sun-ray pattern. Here, in the central disk portion 205, a virtual plane P1 (refer to FIG. 6 and the like) including each vertex of the plurality of grooves 205a is substantially orthogonal to the central axis line C1. It is preferable that the virtual plane P1 be optionally set in design so as to include most of the vertices of the grooves 205a. The boundary rising portion 206 is connected to the radially outer side of the central disk portion 205, and is formed in a substantially annular shape. Here, the boundary rising portion 206 is formed as a substantially cylindrical standing surface which projects forward from the central disk portion 205 in the depth direction along the central axis line C1. The inclined portion 207 is connected to the radially outer side of the front-side end in the depth direction of the boundary rising portion 206 and is formed in a substantially annular shape. The inclined portion 207 is inclined so as to gradually separate from the side of the viewing position 108 from the side of the character display portion 208 toward the side of the central disk portion 205. The character display portion 208 is connected to the radially outer side of the inclined portion 207, and is formed in a substantially annular shape. On the character display portion 208, a plurality of character strings representing a physical quantity regarding the vehicle, that is, a plurality of character strings 208a representing a vehicle speed such as "0" and "20" is provided. Here, in the character display portion 208, a virtual plane P2 including the surface (refer to FIG. 6 and the like) is substantially orthogonal to the central axis line C1. It is preferable that the virtual plane P2 be optionally set in design so as to include the surface of the character display portion 208. The graduation portion 209 is connected to the radially outer side of the character display portion 208, and is formed in a substantially annular shape. The graduation portion 209 is formed slightly inclined with respect to the character display portion 208. The graduation portion 209 is inclined so as to be gradually separated from the side of the viewing position 108 from the side of the frame-like portion 210 toward the character display portion 208. The graduation portion 209 is provided corresponding to a physical quantity regarding the vehicle, in this case, the vehicle speed. A plurality of main graduations 209a and a plurality of auxiliary graduations 209b pointed by the pointer 104 are provided in the gradu-ation portion 209. The plurality of main graduations 209a is formed in a projected shape at equal intervals along the circumferential direction of the character display portion 208. Here, an end of each of the plurality of main graduations 209a on the radially outer side is projected and extended to the frame-like portion 210. The plurality of auxiliary graduations 209b is formed at equal intervals along the circumferential direction of the graduation portion 209. Here, the plurality of auxiliary graduations 209b is formed between the plurality of main graduations 209a at intervals narrower than those of the main graduations 209a and is formed in a projected shape. The frame-like portion 210 is connected to the radially outer side of the graduation portion 209, and is formed in a substantially annular shape. The end of the plurality of main graduations 209a at the radially outer side is positioned on the surface of the frame-like portion 210. Here, in the frame-like portion 210, a virtual plane (not shown) including the surface is substantially orthogonal to the central axis line C1. It is preferable that the virtual plane (not shown) be optionally set in design so as to include the surface of the frame-like portion 210. The annular corner portion 211 is connected to the radially outer side of the frame-like portion 210, and is formed in a substantially annular shape. The annular corner portion 211 is formed to be inclined to the opposite side to the inclination of the graduation portion 209 with respect to the frame-like portion 210. The annular corner portion 211 is inclined to be gradually separated from the side of the viewing position 108 from the side of the frame-like portion 210 toward the cylindrical end surface portion 212. The cylindrical end surface portion 212 is connected to the radially outer side of the annular corner portion 211, and is formed in a substantially annular shape. Here, the cylindrical end surface portion 212 is formed as a substantially cylindrical standing surface which folds back from the annular corner portion 211 along the central axis line C1 backward in the depth direction. The mounting portion 213 is connected to the radially outer side of the end on the back side in the depth direction of the cylindrical end surface portion 212, and is formed in a substantially annular shape. The mounting portion 213 is used when placing the dial plate 203 in the housing 101a or the like, and includes a bracket portion 213a and the like.

The dial plate 203 configured as the resin molded article 201 according to the present embodiment has a high gloss region 214 having a relatively high surface glossiness and a low gloss region 215 having a relatively low surface glossiness which are integrally molded. The high gloss region 214 according to the present embodiment is formed by the surface of the central disk portion 205. On the other hand, the low gloss region 215 according to the present embodiment is formed by the inclined portion 207, the character display portion 208, the graduation portion 209, and the surface of the frame-like portion 210. That is, the low gloss region 215 is formed as an annular region so as to surround the high gloss region 214, and the high gloss region 214 is formed as a region inside the low gloss region 215.

Here, in the resin molded article 1 described above has the structure in which the low gloss region 12 is formed as a rough surface region on which a plurality of fine asperities is formed and the surface of the high gloss region 11 is formed a flat smooth region having a higher surface smoothness so as to cause a difference between the glossiness of the high gloss region 11 and the low gloss region 12, that is, the structure for causing a difference between the glossiness by the difference of the roughness of the surfaces. However, for the resin molded article 201, in addition to, or instead of this, the structure may be used for causing the difference according to the pattern applied on the surface. That is, between the high gloss region 214 and the low gloss region 215, the difference of the glossiness may be caused by differing the roughness of the surfaces, and the difference of the glossiness may be caused by making textures of the surface be different from each other by respectively applying different patterns on the surfaces. In addition, the difference of the glossiness may be caused by a combination of the above two methods. In short, as described above, typically, in a case where the glossiness is measured by the same type of measuring instrument, it is preferable that the high gloss region 214 be a region where the average glossiness of the region is relatively high and the low gloss region 215 be a region where the average glossiness of the region is relatively low. The high gloss region 214 according to the present embodiment is a flat smooth region having a high smoothness of the surface of the central disk portion 205 and is a region having relatively high glossiness of the surface by forming the radiation pattern 205b on the surface of the central disk portion 205 by a plurality of grooves 205a. On the other hand, the low gloss region 215 is the rough surface region in which the plurality of fine asperities is formed on the surfaces of the inclined portion 207, the character display portion 208, the graduation portion 209, and the frame-like portion 210, and is a region having relatively low glossiness of the surface since the low gloss region 215 has no pattern. For example, the high gloss region 214 and the low gloss region 215 are integrally molded by transferring a surface pattern, in which the pattern corresponding to the radiation pattern 205b is formed on the mirror-like molded surface and a surface pattern of the molded surface with fine asperities in a common resin molding die for molding the resin molded article 201, on the surface of a predetermined region of the resin molded article 201 at the time of molding. As a material used as the resin molded article 201, for example, various synthetic resins can be used.

As illustrated in FIGS. 5 and 6, the dial plate 203 configured as the resin molded article 201 according to the present embodiment has the high gloss region 214 and the low gloss region 215 adjacent to each other, and a step boundary surface 216 is formed by a step between the high gloss region 214 and the low gloss region 215. The step boundary surface 216 is configured by the surface of the boundary rising portion 206. That is, in the dial plate 203 configured as the resin molded article 201, the surface of the boundary rising portion 206 forms the step boundary surface 216 so that a visual effect can be obtained such that the part of the high gloss region 214 and the part of the low gloss region 215 are separated members although the dial plate 203 is integrally molded and formed of a synthetic resin.

Here, similar to the surrounding surface 106 described above, the part forming the high gloss region 214 (central disk portion 205) and the part forming the low gloss region 215 (inclined portion 207, character display portion 208, graduation portion 209, and frame-like portion 210) are positioned between the light source unit 102 included in the display unit 101 and the viewing position 108 of the occupant and the like relative to the depth direction and is formed as a surface intersecting with the arrangement direction of the light source unit 102 and the viewing position 108, that is, the depth direction, and more specifically, a surface opposed to the viewing position 108 along the depth direction. On the other hand, similar to the standing surface 107 described above, the step boundary surface 216 which functions as a boundary between the high gloss region 214 and the low gloss region 215 is positioned between the light source unit 102 included in the display unit 101 and the viewing position 108 of the occupant and the like relative to the depth direction and is formed as a surface projected toward the driver along the arrangement direction of the light source unit 102 and the viewing position 108, that is, the depth direction.

In the high gloss region 214 and the low gloss region 215 according to the present embodiment, the high gloss region 214 is formed by the central disk portion 205, and the low gloss region 215 is formed by the inclined portion 207, the character display portion 208, the graduation portion 209, and the frame-like portion 210. Therefore, the high gloss region 214 is positioned apart from the viewing position 108 than the low gloss region 215. That is, in the dial plate 203 configured as the resin molded article 201, the low gloss region 215 is positioned closer to the viewing position 108 than the high gloss region 214, and the high gloss region 214 is positioned on the opposite side of the viewing position 108 than the low gloss region 215. In addition, the distance between the viewing position 108 and the high gloss region 214 is different from the distance between the viewing position 108 and the low gloss region 215. A distance D1 between the viewing position 108 and the high gloss region 214 is relatively long, and a distance D2 between the viewing position 108 and a main part of the low gloss region 215 is relatively short.

Here, the viewing position 108 serving as the reference of the distances D1 and D2 will be described in more detail. Typically, it is previously assumed that the viewing position 108 be positioned in a so-called eye range in the vehicle to which the vehicle display devices 100 and 200 and the like are applied. The eye range is "a driver's eye range of a car", which corresponds to a region, where the point of view of the driver is positioned, previously determined according to the vehicle. Typically, the eye range is a statistical representation of distribution of the position of the eyes of the driver in the vehicle. For example, the eye range corresponds to a region including position of the eyes of the driver at a predetermined ratio (for example, 95%) in a state where the driver sits on the driver's seat. That is, the high gloss region 214 and the low gloss region 215 are regions viewed to be almost opposed to the viewing position 108 in the depth direction, and the step boundary surface 216 is recognized as a depth surface along a line-of-sight direction from the viewing position 108.

Here, in a case where a line along the line-of-sight direction from the viewing position 108 is referred to as a reference line-of-sight direction line L1, the reference line-of-sight direction line L1 is substantially parallel to the central axis line C1. The line-of-sight direction from the viewing position 108 is an assumed line-of-sight direction which has been optionally set in advance according to the direction of the line of sight of the driver or the like assumed in the use state of the vehicle display device 200. For example, here, the line-of-sight direction is a direction along the depth direction. The high gloss region 214 and the low gloss region 215 are surfaces intersecting with the reference line-of-sight direction line L1, and the virtual plane P1 of the central disk portion 205, the virtual plane P2 of the character display portion 208, the virtual plane of the frame-like portion 210 (not shown), and the like can be defined as surfaces substantially orthogonal to the reference line-of-sight direction line L1. The distance D1 between the high gloss region 214 and the viewing position 108 is typically equivalent to the distance between the virtual plane P1 and the viewing position 108, and the distance D2 between the character display portion 208 which is the main part (part having the largest area) of the low gloss region 215 and the viewing position 108 is typically equivalent to the distance between the virtual plane P2 and the viewing position 108. The high gloss region 214 and the low gloss region 215 are configured so that at least the distance D1 defined in this manner is longer than the distance D2. That is, in the dial plate 203 configured as the resin molded article 201, the high gloss region 214 is configured as a recessed portion that is separated from the side of the viewing position 108 and recessed. Whereas, the low gloss region 215 is configured as a protruding portion that projects toward the side of the viewing position 108 and approaches the viewing position 108.

Note that the step boundary surface 216 illustrated in FIG. 6 is substantially parallel to the line-of-sight direction from the viewing position 108, and more specifically, the reference line-of-sight direction line L1. FIG. 6 is illustrated as assuming that an angle θ (refer to FIGS. 7, 8, and the like) formed by the step boundary surface 216 and the reference line-of-sight direction line L1 is almost approximately 0 (θ≈0). However, the present invention is not limited to this. As illustrated in FIGS. 7 and 8, the angle θ between the step boundary surface 216 and the reference line-of-sight direction line L1 may be within a predetermined range which has been previously set. Here, the angle θ formed by the step boundary surface 216 and the reference line-of-sight direction line L1 is more specifically an angle on the side of the viewing position 108 and the side of the low gloss region 215 (inclined portion 207) or an angle on the opposite side of the viewing position 108 and the side of the high gloss region 214 (central disk portion 205) relative to the intersection between the step boundary surface 216 and the reference line-of-sight direction line L1. The predetermined range which has been previously set is, for example, a range of about 5° on both sides of the reference line-of-sight direction line L1. For example, with reference to the reference line-of-sight direction line L1, in a case where an angle of the side in which the end of the step boundary surface 216 on the side of the viewing position 108 falls on the side of the low gloss region 215 (counterclockwise side around intersection between step boundary surface 216 and reference line-of-sight direction line L1 in cross sectional views illustrated in FIGS. 6 to 8) is assumed to be positive and an angel of the side in which the end of the step boundary surface 216 on the side of the viewing position 108 falls on the side of the high gloss region 214 (clockwise side around intersection between step boundary surface 216 and reference line-of-sight direction line L1 in cross sectional views illustrated in FIGS. 6 to 8) is assumed to be negative, it is preferable that the step boundary surface 216 be formed so that the angle θ satisfies [−5°≤θ≤+5°]. In a case of [θ=0°], the step boundary surface 216 is formed substantially parallel to the reference line-of-sight direction line L1 as illustrated in FIG. 6. In a case of [0°<θ≤+5°], as illustrated in FIG. 7, the step boundary surface 216 is formed by the end of the step boundary surface 216 on the side of the viewing position 108 inclining to fall toward the low gloss region 215, so that the high gloss region 214 and the low gloss region 215 are not to be overlapped with each other when viewed from the viewing position 108 in the line-of-sight direction. In a case of [−5°≤θ<0°], as illustrated in FIG. 8, the step boundary surface 216 is formed by the end of the step boundary surface 216 on the side of the viewing position 108 inclining to fall toward the high gloss region 214, so that the high gloss region 214 and the low gloss region 215 are to be overlapped with each other and to be hollowed in a zigzag form when viewed from the viewing position 108 in the line-of-sight direction.

Regarding the resin molded article 201 and the vehicle display device 200 described above, the high gloss region 214 and the low gloss region 215 having different surface glossiness are integrally molded in the single resin molded article 201. Therefore, various appearances can be created with the simple structure, and for example, a novel appearance can be realized with the simple structure.

In addition, according to the resin molded article 201 and the vehicle display device 200 described above, the high gloss region 214 and the low gloss region 215 are adjacent to each other, and the step boundary surface 216 is formed by the step between the high gloss region 214 and the low gloss region 215. Therefore, by forming the step boundary surface 216 caused by the step to be a parting surface between the high gloss region 214 and the low gloss region 215, the resin molded article 201 and the vehicle display device 200 can obtain a visual effect such that the part of the high gloss region 214 and the part of the low gloss region 215 are separated although the resin molded article 201 is an integrally molded product made of a synthetic resin. In other words, the resin molded article 201 and the vehicle display device 200 can realize an appearance in which a plurality of components is incorporated although the resin molded article 201 is an integrally molded product made of a synthetic resin.

In this case, according to the resin molded article 201 and the vehicle display device 200 described above, similar to the high gloss region 214, it is preferable that the step boundary surface 216 be a flat smooth region with a high surface smoothness so that the glossiness of the surface is relatively higher than that of the low gloss region 215. In this case, the resin molded article 201 and the vehicle display device 200 can suppress the scattering of the light reflected on the surface of the step boundary surface 216, and can suppress the reflected light toward the viewing position 108. As a result, the resin molded article 201 and the vehicle display device 200 can show the depth of the step between the high gloss region 214 and the low gloss region 215 formed by the step boundary surface 216 deeper and can highlight the step. Therefore, the visual effect such that the part of the high gloss region 214 and the part of the low gloss region 215 are separated members can be more effectively obtained.

In addition, according to the resin molded article 201 and the vehicle display device 200 described above, the high gloss region 214 is positioned apart from the low gloss region 215 than the viewing position 108. Therefore, in the resin molded article 201 and the vehicle display device 200, the high gloss region 214 is configured as a recessed portion that is separated from the side of the viewing position 108 and recessed, and the low gloss region 215 is configured as a protruding portion that projects toward the side of the viewing position 108 and approaches the viewing position 108. Therefore, a geometric arrangement can be realized in which the mat low gloss region 215 is positioned on the side of the viewing position 108 as viewed from the side of the viewing position 108 and the high gloss region 214 with higher glossiness is positioned on the depth side of the low gloss region 215. As a result, the resin molded article 201 and the vehicle display device 200 can improve the sense of depth in the high gloss region 214 and can emphasize the contrast between the high gloss region 214 and the low gloss region 215. Therefore, the visual effect such that the part of the high gloss region 214 and the part of the low gloss region 215 are separated members can be more effectively obtained.

In addition, according to the resin molded article 201 and the vehicle display device 200 described above, the high gloss region 214 and the low gloss region 215 are formed so that the patterns (textures) on the surface are different from each other. Here, in the resin molded article 201 and the vehicle display device 200, the radiation pattern 205b is applied to the surface of the high gloss region 214, and the surface of the low gloss region 215 is formed without having a pattern. Therefore, the resin molded article 201 and the vehicle display device 200 can emphasize the contrast between the high gloss region 214 and the low gloss region 215 by the patterns formed on the surface of the resin molded article 201. Therefore, the visual effect such that the part of the high gloss region 214 and the part of the low gloss region 215 are separated members can be more effectively obtained.

In addition, according to the resin molded article 201 and the vehicle display device 200 described above, the low gloss region 215 is formed as an annular region so as to surround the high gloss region 214, and the high gloss region 214 is formed as a region in the low gloss region 215. Therefore, the resin molded article 201 and the vehicle display device 200 can emphasize the contrast between the high gloss region 214 and the low gloss region 215 by annularly surrounding the high gloss region 214 with the low gloss region 215. Therefore, the visual effect such that the part of the high gloss region 214 and the part of the low gloss region 215 are separated members can be more effectively obtained. Here, in the resin molded article 201 and the vehicle display device 200, the high gloss region 214 which is placed on the inner side relative to the viewing position 108 is formed as a recessed portion, and the low gloss region 215 which is placed on the outer side is formed as a protruding portion. Therefore, in this point, the visual effect such that the part of the high gloss region 214 and the part of the low gloss region 215 are separated members can be more effectively obtained.

In addition, according to the resin molded article 201 and the vehicle display device 200 described above, the step boundary surface 216 is formed so that the angle θ formed by the step boundary surface 216 and the reference line-of-sight direction line L1 along the line-of-sight direction from the viewing position 108 which has been previously set is within a range of about 5° on both sides of the reference line-of-sight direction line L1 and about 10° in total. Therefore, in the resin molded article 201 and the vehicle display device 200, it is possible to surely and visually recognize the step boundary surface 216 which functions as a boundary between the high gloss region 214 and the low gloss region 215. Therefore, the visual effect such that the part of the high gloss region 214 and the part of the low gloss region 215 are separated members can be more effectively obtained.

In addition, according to the resin molded article 201 and the vehicle display device 200 described above, the step boundary surface 216 is formed to be inclined toward the reference line-of-sight direction line L1 so that the high gloss region 214 and the low gloss region 215 are formed to be overlapped with each other and in a zigzag form as viewed from the line-of-sight direction from the viewing position 108. Therefore, in the resin molded article 201 and the vehicle display device 200, one of the high gloss region 214 and the low gloss region 215 enters under the other, and one of them overhangs on the other. The partition between the high gloss region 214 and the low gloss region 215 can be more emphasized. Therefore, the visual effect such that the part of the high gloss region 214 and the part of the low gloss region 215 are separated members can be more effectively obtained.

The resin molded article and the vehicle display device according to the embodiments of the present invention are not limited to the embodiments, and various modifications are possible within the scope described in the claims. The resin molded article and the vehicle display device according to the present embodiment may be configured by appropriately combining the components of the embodiments and modifications.

In the above description, the resin molded article 1 is described as being applied to the facing plate 105 and the pointer 104 of the vehicle display device 100. However, the present invention is not limited thereto, and may be applied to other part of the vehicle display device 100.

In the above, the description has been made as assuming that the display unit 101 is an analog meter that displays various measured values regarding the vehicle in an analog manner by using the pointer 104 which is a solid object. However, the display unit 101 is not limited to this, and may use a thin display such as a TFT liquid crystal display, a plasma display, and an organic EL display.

In the above, the description has been made as assuming that the high gloss region 11 includes the ring-shaped high gloss region 11A, the frame-shaped high gloss region 11B, and the cover high gloss region 11C, and the low gloss region 12 includes the front low gloss region 12A, a side low gloss region 12B, the cover low gloss region 12C, and the cap low gloss region 12D. However, the present invention is not limited to this combination, and it is preferable that the high gloss region 11 and the low gloss region 12 be integrally molded in the single resin molded article 1. For example, the cover high gloss region 11C and the cover low gloss region 12C may be reversed. That is, the high gloss region 11 may be molded on the surface of the groove 143a, and the low gloss region 12 may be formed on the surface of the edge 143b.

In the above, the description has been made as assuming that the high gloss region 11 is molded, for example, as a flat smooth region having a high surface smoothness, and the low gloss region 12 is molded, for example as a rough surface region on which a plurality of fine asperities is formed. However, the present invention is not limited thereto, and it is preferable that the reflection amounts of the light in the high gloss region 11 be different from that in the low gloss region 12 and the glossiness of the high gloss region 11 be different from that of the low gloss region 12. For example, after both of the high gloss region 11 and the low gloss region 12 have been molded as regions on which the plurality of fine asperities is formed, and the densities or the like of the fine asperities of the high gloss region 11 and the low gloss region 12 are made to be different from each other. By the above processing, it is preferable that the high gloss region 11 be molded as an uneven region with gloss and the low gloss region 12 be molded as an uneven region without gloss. Furthermore, similar to the high gloss region 214 and the low gloss region 215, the high gloss region 11 and the low gloss region 12 may respectively have structures having different glossiness from each other according to the presence/absence and the type of the patterns.

In the above description, it has been assumed that, in the resin molded article 201 and the vehicle display device 200, the radiation pattern 205b is applied on the surface of the high gloss region 214 and the surface of the low gloss region 215 is formed without having a pattern. However, the present invention is not limited to this. In the high gloss region 214 and the low gloss region 215, a spin pattern formed by extending the plurality of grooves in a concentrically annular shape or a spiral and annular shape around the reference point which has been previously set (for example, point on the central axis line C1) may be applied on the surface. In addition, to the high gloss region 214 and the low gloss region 215, other patterns such as a weave pattern (carbon style pattern), a knurled pattern, a pattern regularly combining groove shapes, a geometric pattern such as a honeycomb structure, a pattern having a metal cut mark such as a hairline tone and a finishing mark, a guilloche pattern, and a pattern imitating a texture such as leather grains may be applied. Furthermore, the surface of the high gloss region 214 may be formed in a piano black tone. In addition, in the above description, it has been assumed that the high gloss region 214 and the low gloss region 215 be formed to have the surface patterns (texture) different from each other. However, the present invention is not limited to this, and the high gloss region 214 and the low gloss region 215 may have similar patterns and may be formed without having the patterns.

In the above description, it has been assumed that, regarding the high gloss region 214 and the low gloss region 215, the high gloss region 214 is positioned apart from the low gloss region 215 with respect to the viewing position 108 and the low gloss region 215 is positioned on the side of the viewing position 108 than the high gloss region 214 and the high gloss region 214 is positioned on the opposite side of the viewing position 108 than the low gloss region 215. However, the present invention is not limited to this. Regarding the high gloss region 214 and the low gloss region 215, the low gloss region 215 may be positioned apart from the high gloss region 214 with respect to the viewing position 108, the high gloss region 214 may be positioned on the side of the viewing position 108 than the low gloss region 215, and the low gloss region 215 may be positioned on the opposite side of the viewing position 108 than the high gloss region 214.

In the above description, it has been assumed that the low gloss region 215 be formed as an annular region so as to surround the high gloss region 214 and the high gloss region 214 be formed as a region in the low gloss region 215. However, the present invention is not limited to this. The positions of the high gloss region 214 and the low gloss region 215 may be reversed, and it is not necessary for the high gloss region 214 and the low gloss region 215 to be the annular region or the region surrounded by the annular region.

In addition, the step boundary surface 216 described above may be applied to the resin molded article 1, and may be provided between the cover high gloss region 11C and the cover low gloss region 12C of the pointer 104, for example.

Since a high gloss region and a low gloss region having different surface glossiness are integrally formed in a single resin molded article, a resin molded article and a vehicle display device according to the present embodiments obtain an effect such that various appearances are created with a simple structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A resin molded article to be applied to a vehicle display device for displaying information on a vehicle, and that has a high gloss region having a relatively high surface glossiness and a low gloss region having a relatively low surface glossiness which are integrally molded, wherein
    the high gloss region and the low gloss region are adjacent to each other, and a step boundary surface is formed by a step between the high gloss region and the low gloss region,
    the step boundary surface is formed so that an angle formed by the step boundary surface and a reference line-of-sight direction line along the line-of-sight direction from a viewing position which has been previously set is within a range of about 5° on both sides of the reference line-of-sight direction line, and the step boundary surface is formed to be inclined to the reference line-of-sight direction line.

2. The resin molded article according to claim 1, wherein the step boundary surface has a surface glossiness relatively higher than that of the low gloss region.

3. The resin molded article according to claim 2, wherein the high gloss region is positioned apart from the low gloss region with respect to a viewing position.

4. The resin molded article according to claim 2, wherein the vehicle display device has a pointer for pointing the information on the vehicle,
    the pointer includes a pointer light emitter that emits light by light from a light source, a shielding part that is interposed between the light source and the viewing position and shields light emitted from the light source toward the viewing position, and a pointer base end cover that is molded integrally with the shielding part and covers a base end of the pointer light emitter,
    the high gloss region is molded on a surface of the pointer base end cover on a side of the viewing position, and
    the low gloss region is molded on a surface of the shielding part on the side of the viewing position.

5. The resin molded article according to claim 2, wherein the vehicle display device includes a display unit for displaying the information on the vehicle and a viewing position facing surface opposed to the viewing position and on which the display unit is exposed,
    the high gloss region is molded on the surface of the viewing position facing surface on the side of the viewing position and the surface of a region around the display unit, and
    the low gloss region is molded on the surface of the viewing position facing surface on the side of the viewing position and in a region outside the region around the display unit.

6. The resin molded article according to claim 2 wherein the vehicle display device includes the viewing position facing surface opposed to the viewing position and a standing surface projected from the viewing position facing surface toward the viewing position along a direction intersecting with the viewing position facing surface,
    the high gloss region is molded on the surface of the standing surface on the side of the viewing position, and
    the low gloss region is molded on the surface of the standing surface on the side of the viewing position facing surface.

7. The resin molded article according to claim 1, wherein the high gloss region is positioned apart from the low gloss region with respect to a viewing position.

8. The resin molded article according to claim 7, wherein
the vehicle display device has a pointer for pointing the information on the vehicle,
the pointer includes a pointer light emitter that emits light by light from a light source, a shielding part that is interposed between the light source and the viewing position and shields light emitted from the light source toward the viewing position, and a pointer base end cover that is molded integrally with the shielding part and covers a base end of the pointer light emitter,
the high gloss region is molded on a surface of the pointer base end cover on a side of the viewing position, and
the low gloss region is molded on a surface of the shielding part on the side of the viewing position.

9. The resin molded article according to claim 7, wherein
the vehicle display device includes a display unit for displaying the information on the vehicle and a viewing position facing surface opposed to the viewing position and on which the display unit is exposed,
the high gloss region is molded on the surface of the viewing position facing surface on the side of the viewing position and the surface of a region around the display unit, and
the low gloss region is molded on the surface of the viewing position facing surface on the side of the viewing position and in a region outside the region around the display unit.

10. The resin molded article according to claim 7 wherein
the vehicle display device includes the viewing position facing surface opposed to the viewing position and a standing surface projected from the viewing position facing surface toward the viewing position along a direction intersecting with the viewing position facing surface,
the high gloss region is molded on the surface of the standing surface on the side of the viewing position, and
the low gloss region is molded on the surface of the standing surface on the side of the viewing position facing surface.

11. The resin molded article according to claim 1, wherein
the vehicle display device has a pointer for pointing the information on the vehicle,
the pointer includes a pointer light emitter that emits light by light from a light source, a shielding part that is interposed between the light source and the viewing position and shields light emitted from the light source toward the viewing position, and a pointer base end cover that is molded integrally with the shielding part and covers a base end of the pointer light emitter,
the high gloss region is molded on a surface of the pointer base end cover on a side of the viewing position, and
the low gloss region is molded on a surface of the shielding part on the side of the viewing position.

12. The resin molded article according to claim 11, wherein
the vehicle display device includes a display unit for displaying the information on the vehicle and a viewing position facing surface opposed to the viewing position and on which the display unit is exposed,
the high gloss region is molded on the surface of the viewing position facing surface on the side of the viewing position and the surface of a region around the display unit, and
the low gloss region is molded on the surface of the viewing position facing surface on the side of the viewing position and in a region outside the region around the display unit.

13. The resin molded article according to claim 11 wherein
the vehicle display device includes the viewing position facing surface opposed to the viewing position and a standing surface projected from the viewing position facing surface toward the viewing position along a direction intersecting with the viewing position facing surface,
the high gloss region is molded on the surface of the standing surface on the side of the viewing position, and
the low gloss region is molded on the surface of the standing surface on the side of the viewing position facing surface.

14. The resin molded article according to claim 1, wherein
the vehicle display device includes a display unit for displaying the information on the vehicle and a viewing position facing surface opposed to the viewing position and on which the display unit is exposed,
the high gloss region is molded on the surface of the viewing position facing surface on the side of the viewing position and the surface of a region around the display unit, and
the low gloss region is molded on the surface of the viewing position facing surface on the side of the viewing position and in a region outside the region around the display unit.

15. The resin molded article according to claim 14 wherein
the vehicle display device includes the viewing position facing surface opposed to the viewing position and a standing surface projected from the viewing position facing surface toward the viewing position along a direction intersecting with the viewing position facing surface,
the high gloss region is molded on the surface of the standing surface on the side of the viewing position, and
the low gloss region is molded on the surface of the standing surface on the side of the viewing position facing surface.

16. The resin molded article according to claim 1, wherein
the vehicle display device includes the viewing position facing surface opposed to the viewing position and a standing surface projected from the viewing position facing surface toward the viewing position along a direction intersecting with the viewing position facing surface,
the high gloss region is molded on the surface of the standing surface on the side of the viewing position, and
the low gloss region is molded on the surface of the standing surface on the side of the viewing position facing surface.

17. A vehicle display device comprising:
a display unit configured to be mounted on a vehicle and display information on the vehicle; and
a resin molded article configured to be provided around the display unit or in a part of the display unit, and that has a high gloss region having a relatively high surface glossiness and a low gloss region having a relatively low surface glossiness which are integrally molded, wherein the high gloss region and the low gloss region are adjacent to each other, and a step boundary surface is formed by a step between the high gloss region and the low gloss region, the step boundary surface is formed so that an angle formed by the step boundary surface and a reference line-of-sight direction line along the line-of-sight direction from a viewing position which has been previously set is within a range of about 5° on both sides of the reference line-of-sight direction line, and the step boundary surface is formed to be inclined to the reference line-of-sight direction line.

\* \* \* \* \*